Jan. 2, 1968 R. W. WYNDRUM, JR 3,361,991

MULTITONE OSCILLATOR EMPLOYING CASCADED ACTIVE R-C FILTERS IN FEEDBACK LOOP

Filed Oct. 4, 1966 3 Sheets-Sheet 1

INVENTOR
R. W. WYNDRUM, JR.
BY
ATTORNEY

Jan. 2, 1968 R. W. WYNDRUM, JR 3,361,991

MULTITONE OSCILLATOR EMPLOYING CASCADED ACTIVE R-C FILTERS IN FEEDBACK LOOP

Filed Oct. 4, 1966 3 Sheets-Sheet 3

United States Patent Office 3,361,991

Patented Jan. 2, 1968

3,361,991

MULTITONE OSCILLATOR EMPLOYING CASCADED ACTIVE R-C FILTERS IN FEEDBACK LOOP

Ralph W. Wyndrum, Jr., New Providence, N.J., assignor to Bell Telephone Laboratories, Incorporated, Berkeley Heights, N.J., a corporation of New York

Filed Oct. 4, 1966, Ser. No. 584,195

10 Claims. (Cl. 331—110)

This invention relates to multifrequency signaling systems and more particularly to signal generators that produce a plurality of coincident oscillatory signal bursts.

Multifrequency signal generators with the capability of producing simultaneous unique frequency combinations are well known as shown for example by L. A. Meacham and F. West in Patent 3,184,554 issued May 18, 1965. Such generators have potential utility in various transmission systems in which the intelligence to be transmitted is expressed in terms of a frequency code. For example, one form of the arrangement disclosed by Meacham and West is employed commercially as a pushbutton-operated, dial-signal generator for a telephone commonly termed a Touch-Tone® set.

Typical multifrequency signal generators such as the Touch-Tone dial circuit employ a single transistor oscillator with an inductively coupled feedback circuit. Inductance taps responsive to pushbutton actuated switchings are completed to form a unique pair of tuned circuits in the feedback path for each operated button and a corresponding coincident pair of unique frequency bursts is produced.

The advent of dial-in-handset telephones that eliminates the conventional telephone set base by locating the voice network and dial in the handset proper, has created a need for a substantial reduction in the space occupied by the dial-signal generator circuit. This need is well illustrated by the type of dial-in-handset phone shown by R. E. Prescott et al. in Patent 3,123,676 issued Mar. 3, 1964. One means of reducing the size of multifrequency signal generators is shown by R. L. Breeden and R. M. Rickert in their patent application Ser. No. 487,138, filed Sept. 14, 1965. Breeden and Rickert utilize a pair of transistor oscillator circuits each employing a high gain amplifier with a respective R-C notch filter in each feedback path. Each of the filter networks includes switching means responsive to the operation of a pushbutton dial for connecting one of a plurality of frequency determining resistors into the network. With the elimination of inductor from the oscillator circuits, space requirements are reduced substantially and fabrication by integrated circuit techniques is made feasible.

One disadvantage of the Breeden-Rickert type of circuit is the need for two high gain amplifiers. Additionally, frequency stability is dependent upon the precise level of amplifier gain. An obvious step to eliminate one amplifier would appear to be the incorporation of both notch filters in the feedback loop of a single amplifier in a manner analogous to that employed by Meacham and West. Unfortunately, the problem is more complex. R-C notch filter circuits cannot readily be combined in the manner of L-C tuned circuits with a common tapped inductance and all known previous attempts to utilize separate notch filters in the feedback path of a single amplifier have been completely unsuccessful from the standpoint of frequency pulling and distortion which are caused in part by interaction between the simultaneously generated frequencies.

Accordingly, one broad object of the invention is to simplify multifrequency oscillator circuits.

Another object is to reduce the dependency of frequency stability on amplifier gain in a multifrequency oscillator employing frequency determining R-C notch filters.

The principles of the invention stem in part from a realization that exceptionally high frequency stability and minimal frequency interdependence may be achieved in a multifrequency oscillator without the use of inductors by combining a plurality of active feedback networks into a single major composite feedback loop around a single high gain amplifier. An oscillator in accordance with the invention is therefore ideally suited for fabrication by integrated hybrid thin film circuit techniques with the attendant advantages of low cost, small size and high reliability.

In one illustrative embodiment of the invention a relatively high gain (40 db.) transistor inversion amplifier is employed as the basic driving unit in the forward path. The main feedback loop comprises a cascade connected pair of symmetric twin-T R-C notch filters. A key feature of the main feedback loop is that each of the filters is in circuit combination with a respective low gain (approaching unity) transistor amplifier. In accordance with the invention each of these feedback structures is suitably adjusted so that each in itself is a highly selective notch network. The frequency of the notch of each of these circuits is defined closely, in terms of circuit analysis theory, by the imaginary part of the positive transmission zero when this zero is designed to be close to the $j\omega$ axis and in the right half of the complex frequency plane.

In analyzing a circuit in accordance with the invention it has been discovered that a separate and distinct oscillation may occur in each of the feedback loop circuits and is dependent on the feedback coefficient $k$, which corresponds to the amplification of the feedback loop amplifiers. It can be shown that if $k$ is made sufficiently large, i.e. sufficiently close to unity, the pole of the feedback network takes the position necessary for sustained oscillation as it travels just into the right half of the complex frequency plane and approaches the right half plane transmission zero. When a composite feedback network in accordance with the invention is connected into the major feedback path of a high gain inversion amplifier, the resulting circuit structure generates oscillations at each of two predictable frequencies and analysis shows that the right half plane zeros of the feedback network become the significant poles of the new configuration.

A key aspect of the invention resides in the manner in which the unique properties of active notch filter networks are turned to account. As indicated above, these networks are connected in cascade in the main feedback loop. Owing to the fact that each network has essentially unity transmission at all frequencies other than those in the very near vicinity of the transmission zero, each network passes substantially undiminished any nearby frequency that is generated in the other. It is specifically this property that makes two frequencies available independently with minimal frequency interdependence.

The principles of the invention together with additional objects and features thereof will be fully apprehended from the following detailed description of an illustrative embodiment and from the drawing in which.

Figure 1:
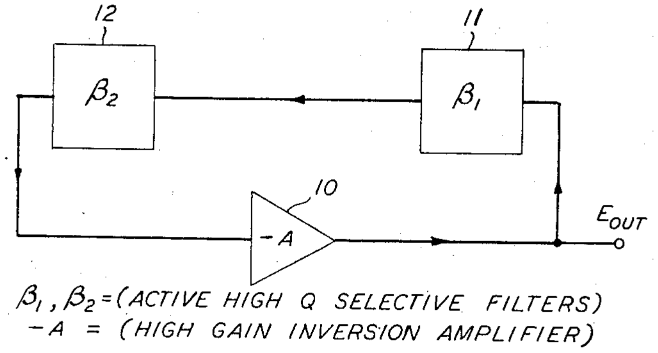
FIG. 1 is a simplified block diagram of a two-tone oscillator in accordance with the invention.

The broad concept of a multifrequency oscillator employing only a single high gain amplifier in the forward path is illustrated by the block diagram of FIG. 1. The amplifier 10 may be any one of a number of suitable prior art circuits, such as a conventional high gain inversion circuit, preferably employing transistors. A gain on the order of 40 db is desirable, and inversion (180° phase shift) is essential. As indicated, the feedback path includes two separate and distinct feedback networks $\beta_1$ and $\beta_2$. If the circuit is to be employed as a mulitfrequency generator, such as a dial signal generator in a Touch-Tone telephone set, for example, the generated frequencies must be closely spaced and little or no frequency interaction can be tolerated. It is evident, therefore, that the performance of the $\beta_1$ and $\beta_2$ networks must be characterized by an exceptionally high degree of frequency selectivity. How this selectivity is achieved in accordance with the principles of the invention is indicated broadly by FIG. 2.

Figure 2:
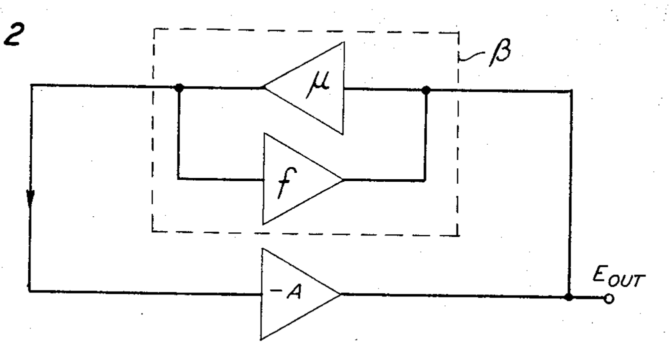
FIG. 2 is a block diagram of one portion of the multiple loop feedback structure indicated generally in FIG. 1.
Figure 4:
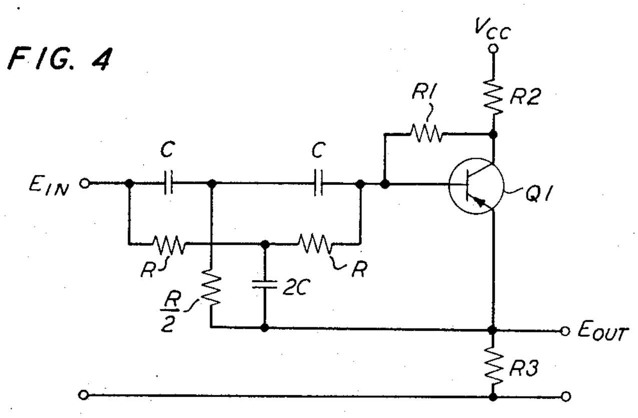
FIG. 4 is a schematic circuit diagram of one of the active selective R-C notch filter networks shown in block form in FIG. 3.

In FIG. 2 it is shown that the feedback network $\beta$, being representative of the form of each of the networks $\beta_1$ and $\beta_2$ of FIG. 1, comprises a forward path $\mu$ in combination with its own active feeback path $f$ so that the overall circuit is aptly termed a multiple loop feedback structure. A specific illustrative circuit form of the $\beta$ network is shown in FIG. 4. The passive part of the $\beta$ network is a conventional R-C twin-T notch filter employing identical capacitive elements C—C shunted by a pair of series connected resistive elements R—R. A single resistive element R/2 has one terminal connected to the junction point of the capacitive elements C—C and a single capacitive element 2C is similarly connected to the junction of the resistive elements R—R. The free terminals of the resistive element R/2 and the capacitive element 2C are connected to the circuit output point $E_{out}$. Either of the single element R/2 or 2C may be slightly altered to produce zeros just into the right half plane instead of the $j\omega$ axis.

The circuit of FIG. 4 may also be described as a high-pass T section of the R-C type connected in parallel with an R-C low-pass T section. The transmission characteristics of such filters are marked by an abrupt attenuation of signals of a particular frequency with adjacent frequencies being attenuated to a very limited degree so that the frequency spectrum shows a clearly identifiable "notch." It is well known that notch filters are particularly useful as a means for providing positive or regenerative feedback in an oscillator owing to the 180° phase shift that occurs in a signal oscillating at the notch frequency and further, owing to the fact that signals only slightly off the notch frequency depart markedly from this phase shift. Consequently, in the feedback loop of an oscillator whose amplifier has shifted the phase by 180° from its input to its output, an additional 180° phase shift produces regenerative feedback at the notch frequency. The sharp phase departure at other frequencies effects the suppression of non-notch frequencies.

In accordance with the principles of the invention the amplifier to be combined with each of the $\beta_1$ and $\beta_2$ networks may take any one of a number of forms provided, however, that the gain $k$ thereof, for reasons discussed in detail hereinbelow, is slightly less than unity. Suitable characteristics are provided by the single transistor Q1 emitter follower circuit shown in FIG. 4. Power is supplied from the source $V_{cc}$. Resistors R1 and R2 establish the proper biasing levels for the base and collector of transistor Q1. The output of this circuit is developed across resistor R3.

Insight as to the nature of the performance of the $\beta$ network shown generally in FIG. 2 and more specifically in FIG. 4 can be gained from considering the $\beta$ network voltage transfer function of the simplest case of an active twin-T filter adjusted for a perfect notch at $$W=j1 \tag{1}$$

where $$W=j\omega RC=sRC \tag{2}$$

which places the zeros of transmission on the $j\omega$ or imaginary axis. The transfer function of the $\beta$ network as illustrated in FIG. 4 may be conventionally expressed as $$\beta=\frac{W^2+1}{W^2+4W(1-k)+1} \tag{3}$$

since we may identify $$\beta=\frac{\mu}{1-\mu f} \tag{4}$$

$$\mu=\frac{W^2+1}{W^2+4W+1} \tag{5}$$

and $$f=\frac{4Wk}{W^2+1} \tag{6}$$

It is evident from Equation 3 that the notch frequency is mathematically independent of $k$ since $k$ does not appear in the numerator. Instead, the notch frequency is dependent *only* upon the stable R-C passive elements. Stated otherwise, it is clear that the frequency sensitivity of the oscillator to the R-C product of the notch is unaffected by the addition of active elements.

Figure 5A:
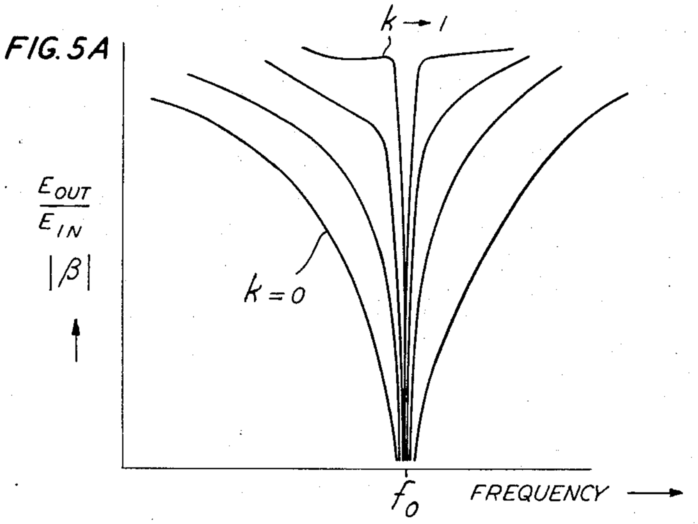
FIG. 5A is a plot of the effect of various levels of amplification on the transmission characteristics of a single notch filter.
Figure 5B:
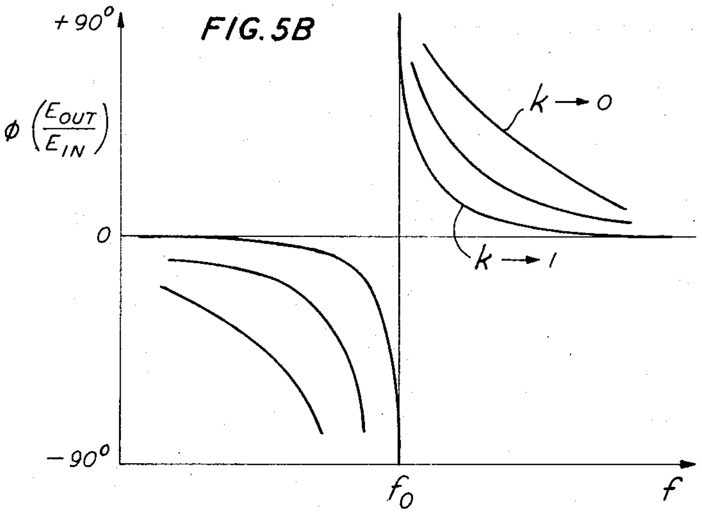
FIG. 5B is a plot of the effect of various levels of amplification on the phase shift characteristics of a single notch filter.

Although the location of the notch is shown to be independent of $k$, it is even more pertinent to observe that the sharpness of the notch, or the selectivity of the filter, is controlled directly by $k$. By a straightforward mathematical analysis of the effect of changing values of $k$ on the poles and zeros of transmission of the $\beta$ network, proceeding from Equation 3, it can be shown that as $k \to 1$ the notch becomes increasingly sharp and the filter increasingly selective. This conclusion is confirmed by the family of curves shown in FIG. 5A which have been plotted driectly from data taken from operating circuits of the form shown in FIG. 2 with a $\beta$ network structure of the form shown in FIG. 4 as the amplification of the feedback path amplifier approaches unity.

Figure 3:
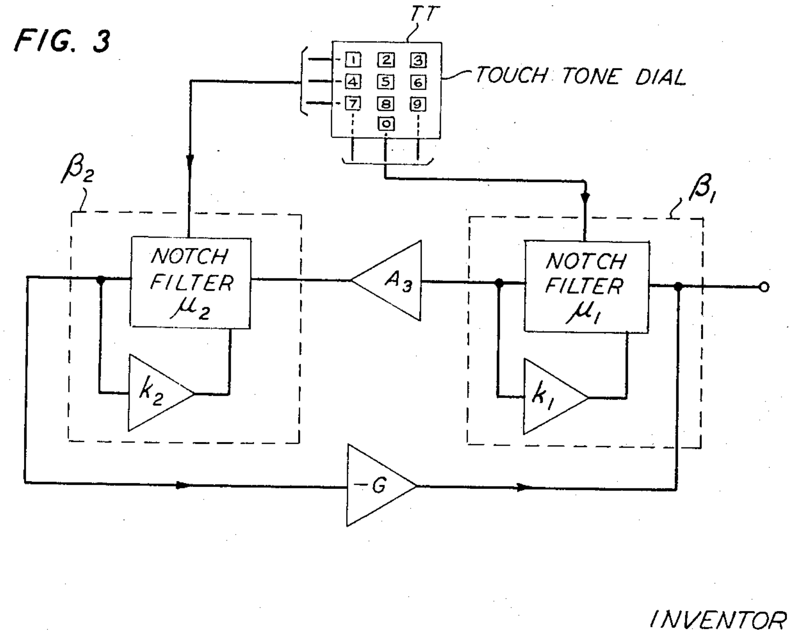
FIG. 3 is a complete block diagram of a two-tone oscillator in accordance with the invention.

In the light of the performance characteristics of the $\beta$ network of FIG. 4, where $k$ is the gain of the emitter follower, employed as indicated in FIG. 2, it is of interest to return to the circuit of FIG. 1 and examine the results obtained in an oscillator circuit emloying at least two active twin-T $\beta$ networks. A more detailed block form configuration of such a circuit is shown in FIG. 3. From the curves shown in FIGS. 6A and 6B which represent the overall loop gain and phase characteristics of the circuit of FIG. 3, it is evident that the exceptional selectivity of the active feedback path permits the attainment of *two* predictable frequencies of oscillation from only *one* major feedback loop around a high gain amplifier. Significantly, with respect to the objects of the invention, this capability allows the simultaneous generation of two frequencies, in the audio range for example, without the necessity of summing the outputs of two separate oscillators.

Figure 6A:
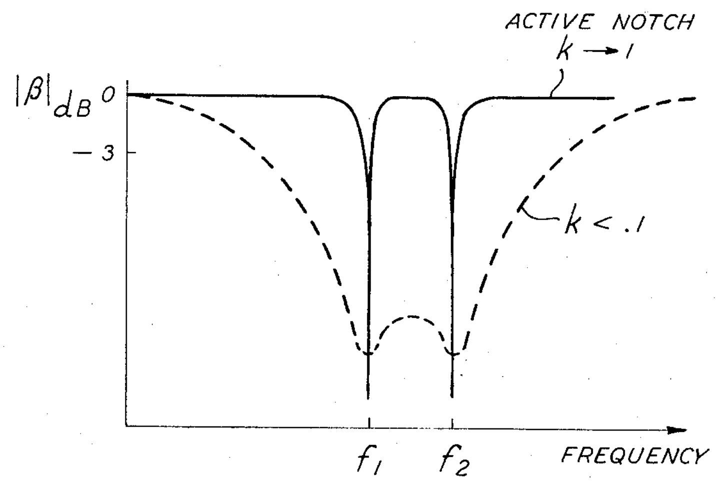
FIG. 6A is a plot of the $\beta$ loop gain characteristics of the circuit shown in FIG. 3 for various levels of loop amplification.
Figure 6B:
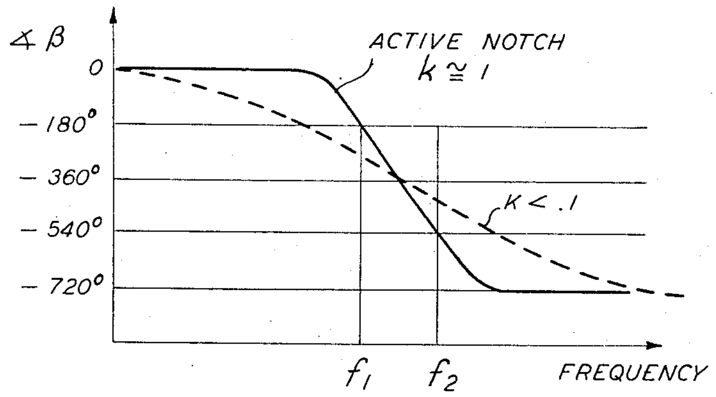
FIG. 6B is a plot of the $\beta$ loop phase characteristics of the circuit shown in FIG. 3 for various levels of loop amplification.

From the dotted curves of FIGS. 6A and 6B it is also clear that simultaneous and independent oscillation at two frequencies cannot be achieved by the circuit of FIG. 3 if $k<.1$, or as $k$ closely approaches zero. In FIG. 6A, only a very slight rejection of the non-notch frequencies is indicated between the notch frequency $f_1$ and $f_2$ where $k<.1$. Moreover, in practice it has been found that the two shallow notch frequencies either merge into a single intermediate frequency or otherwise combine into a complex and unusable band of frequencies, and non-sinusoidal oscillation results.

The phase characteristics shown in FIG. 6B demonstrate that with $k \cong 1$, both of the notch frequencies undergo the necessary 180° phase shift but with $k<.1$ the phase shift obtained is obviously unsuitable to support oscillation at the notch frequencies. The curves of FIGS. 6A and 6B taken together also demonstrate that the two simultaneously generated frequencies are separate, distinct and noninterfering from the standpoint of both phase and frequency. Frequency independence, as discussed above, is a product of the sharp notch configurations that are formed in the frequency spectrum of the complex feedback loop. It is the sharpness of the notch that ensures undistorted transmission by each $\beta$ network of the other notch frequencies, even though the notch frequencies may be spaced relatively closely. Phase independence, as shown in FIG. 6B, is reflected not only in the sharp 180° phase shift that occurs at the notch frequencies $f_1$ and $f_2$ but also in the complete absence of phase departure (which also may be viewed as a 360° phase shift) between the notch frequencies.

In addition to the high gain amplifier $-G$ and the $\beta_1$ and $\beta_2$ feedback network amplifiers $k_1$ and $k_2$, the circuit shown in FIG. 3 also includes a buffer amplifier $A_3$. Under ideal conditions, a buffer amplifier is not required. However, under varying environmental conditions and in instances where $\beta$ network circuit components, whether discrete or integrated, may depart from their designed values, the extra isolation provided by the buffer amplifier $A_3$ has been found to be desirable. In contrast to the critical nature of the amplification provided by amplifiers $k_1$ and $k_2$ (must approach unity), the level of amplification provided by amplifier $A_3$ is not a factor in the overall circuit performance.

It will be evident to persons skilled in the art that a frequency generator embodying the principles of the invention is particularly suitable for use as the signal generator of a multifrequency signaling telephone such as the Touch-Tone set. Such use is indicated diagrammatically by Touch-Tone dial TT in FIG. 3. Specific details of how the dial TT may be employed to control the notch frequencies of a pair of notch filters are shown by Breeden and Rickert in their application Serial No. 487,138 filed Sept. 14, 1965. A detailed system illustrating the employment of multifrequency or Touch-Tone telephone signaling has been disclosed by L. A. Meacham and F. West in United States Patent 3,184,554 issued May 18, 1965.

It is to be understood that the system disclosed herein is merely illustrative of the principles of the invention. Various modifications thereto may be devised by persons skilled in the art without departing from the spirit and scope of the invention.

What is claimed is:

1. A multifrequency signal generator comprising, in combination, a high gain amplifier having a main feedback loop, said loop including a plurality of active R-C frequency determining networks in tandem relation, each of said networks corresponding to a respective frequency whereby said generator produces coincident oscillatory signal bursts at each of said frequencies.

2. Apparatus in accordance with claim 1 wherein each of said networks comprises a respective notch filter.

3. Apparatus in accordance with claim 1 wherein each of said networks comprises a respective notch filter in circuit combination with a respective amplifier of substantially unity gain.

4. A multifrequency signal generator comprising, a relatively high gain amplifier with a composite feedback loop, said loop comprising a plurality of R-C frequency determining networks in tandem relation each in relation with a respective low gain feedback amplifier, each of said networks corresponding to a respective frequency, whereby said generator produces coincident noninterfering signal bursts at each of said frequencies.

5. Apparatus in accordance with claim 4 wherein said R-C elements are connected in a twin-T filter configuration.

6. Apparatus in accordance with claim 4 wherein said R-C elements are connected in a twin-T filter configuration and wherein the gain of each of said low gain amplifiers is substantially unity.

7. A multifrequency signal generator comprising, in combination, a relatively high gain amplifier having a main feedback loop, said loop comprising first and second active R-C frequency determining networks connected in tandem relation by a buffer amplifier, each of said networks corresponding to a respective frequency, whereby said generator produces coincident oscillatory signal bursts at each of said frequencies.

8. Apparatus in accordance with claim 7 wherein each of said networks comprises a respective notch filter.

9. Apparatus in accordance with claim 7 wherein each of said networks comprises a respective notch filter in circuit combination with a respective amplifier of substantially unity gain.

10. Apparatus in accordance with claim 9 wherein said notch filter is connected in twin-T configuration.

No references cited.

ROY LAKE, *Primary Examiner.*

S. H. GRIMM, *Assistant Examiner.*